US006842506B1

(12) United States Patent
Bedingfield

(10) Patent No.: US 6,842,506 B1
(45) Date of Patent: Jan. 11, 2005

(54) METHOD AND SYSTEM FOR MESSAGE ROUTING

(75) Inventor: James C. Bedingfield, Lilburn, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 681 days.

(21) Appl. No.: 09/742,376

(22) Filed: Dec. 22, 2000

(51) Int. Cl.$^7$ .......................... H04M 1/64; H04M 3/42; H04M 7/00

(52) U.S. Cl. ............................... 379/88.12; 379/98.17; 379/88.19; 379/201.01; 379/219; 379/220.01; 379/221.13

(58) Field of Search ...................... 379/67.1, 74, 88.09, 379/88.11, 88.12, 88.17, 88.19, 201.01, 201.07, 201.08, 201.12, 207.02, 207.11, 207.12, 211.02, 212.01, 219, 220.01, 221.01, 221.02, 221.08, 221.13, 221.14; 455/432, 455, 460, 461, 412, 413, 414

(56) References Cited

U.S. PATENT DOCUMENTS

| | | | | |
|---|---|---|---|---|
| 5,732,131 A | * | 3/1998 | Nimmagadda et al. | 379/221.13 |
| 5,867,570 A | * | 2/1999 | Bargout et al. | 379/221.13 |
| 6,052,458 A | * | 4/2000 | Amir-Ebrahimi | 379/229 |
| 6,438,223 B1 | * | 8/2002 | Eskafi et al. | 379/221.13 |
| 6,445,785 B1 | * | 9/2002 | Chan et al. | 379/221.13 |
| 6,466,792 B1 | * | 10/2002 | Copley | 455/445 |
| 6,721,415 B1 | * | 4/2004 | Gilbert | 379/221.09 |
| 6,724,863 B1 | * | 4/2004 | Bedingfield | 379/88.12 |
| 6,731,926 B1 | * | 5/2004 | Link, II et al. | 455/412.2 |

OTHER PUBLICATIONS

Generic Switching and Signaling Requirement, Versions 1.00 (Feb. 12, 1996), pp. 1–75, 1.10 (Apr. 3, 1996), pp. 1–79, 1.02 (Jun. 17, 1996), pp. 1–83, 1.03 (Sep. 4, 1996), pp. 1–79, 1.04 (Jan. 20, 1997), pp. 1–79 and 1.05 (Aug. 1, 1997), pp. 1–79.
Lucent Technologies; *Illinois No. Portability Workshop, SCP Generic Requirements*, pp. 1–52.
Ameritech; *Illinois Number Portability Workshop*, Generic Operator Services Switching Requirements (Issue 1.1, Jun. 20, 1996), pp. 1–58.
Nortel Networks; *Maryland Number Portability Consortium*, Generic Switching and Signaling Requirements, (Draft Version 1.0, Apr. 22, 1996), pp. 1–4.

* cited by examiner

Primary Examiner—Allan Hoosain
(74) Attorney, Agent, or Firm—Thomas, Kayden, Horstemeyer & Risley, LLP

(57) ABSTRACT

A method and system for forwarding information, such as a message waiting indicator (MWI) message, to a telephone number corresponding to a foreign network (e.g., a wireless network) and a shared NPA/NXX. The invention evaluates individual telephone numbers of shared NPA/NXXs to determine to what networks to send messages. A representative embodiment of the invention uses a service control point and service package application to deliver an MWI message from a messaging service provider to a wireless (i.e., foreign network) telephone number of a shared NPA/NXX. Shared NPA/NXXs are marked as "portable" in a signal transfer point for forwarding to the service control point, which determines whether the shared NPA/NXX telephone numbers require local number portability global title translation or should be forwarded to an inter-switch voicemail routing (ISVMR) service package application. The ISVMR service package application determines the point code to which the MWI message should be routed.

35 Claims, 4 Drawing Sheets

METHOD AND SYSTEM FOR MESSAGE ROUTING

BACKGROUND

1. Field of the Invention

The present invention relates to the field of switched telephony, and more particularly, to a method and system for integrating wireless telephones into a wireline messaging environment.

2. Background of the Invention

With the proliferation of wireless communication networks, many telephone customers now use a combination of wireline and wireless telephones to meet their communication needs. Indeed, it is not uncommon for a single user to have more than one telephone line at home, more than one telephone line at work, and at least one wireless telephone. Telephone customers have come to depend on the flexibility of this combination to communicate irrespective of location.

However, having multiple wireline and wireless telephone numbers presents problems retrieving telephone messages. Usually, a caller who calls a user who subscribes to multiple telephone lines dials one of the user's telephone numbers. If the user is away from the particular device that is called and does not answer the call, the caller typically leaves a message on a voicemail system. In the past, such voicemail systems have been isolated on the network of the particular telephone line that is called. Thus, to retrieve all messages, a user had to check the voicemail system of each network separately.

Recognizing the trouble of constantly checking multiple voicemail systems, messaging service providers (MSPs) developed voicemail systems that integrate incoming messages across different networks. Thus, for example, a user could direct all messages for her wireline and wireless telephone lines to a single voicemail box. Consequently, the user would need only to check a single voicemail box to retrieve all messages.

According to these standard voicemail systems, a voicemail platform is in communication with a central office switch. The central office switch is in communication with the wireline and wireless networks. Unanswered calls to a subscriber's wireline and wireless telephone numbers are routed to the voicemail platform through the central office. Thus, regardless of the particular telephone number the caller dials, all voicemail messages end up in the same voicemail platform.

Despite providing centralized voicemail boxes, these integrated voicemail services present difficulties in notifying a user of the receipt of a message. Specifically, because all unanswered calls are forwarded through the central office to the voicemail platform, the voicemail platform is responsible for activating message waiting indicators on all of the associated telephones (e.g., a stutter dial tone, an illuminated light, or a displayed icon). Thus, for example, if a user away from his work office receives an unanswered call to his wireline office telephone, and the call is forwarded to the voicemail platform, which records a message, then, ideally, the user would want to receive a message waiting indicator on his wireless telephone to report to him that he has received a new voicemail message. This notification would avoid the burden of constantly checking the voicemail for messages received through a remote telephone. Similarly, if the user is in his office and receives a message through an unanswered call to his wireless telephone, which is turned off or out of range, the user would want to receive an indication of the message on his office wireline telephone.

To provide message waiting indicators on all of a user's associated telephones, wireline network providers developed methods for supporting messaging from the voicemail platform to a "foreign network." As used herein, "foreign network" refers to a network that is not local to the network including the central office switch that serves the message provider. This local central office switch is sometimes referred to herein as the host switch.

FIG. 1 illustrates a typical method and system for providing messaging from a voicemail platform to a foreign network. Messaging service provider 100 contains a telephone list 102 indicating telephone numbers that a subscriber to the messaging service has associated with her voicemail box. An unanswered call to any of the listed telephone numbers is routed to messaging service provider 100 for the recording of a message and the indicating of the recorded message. In this example, the subscriber has associated with the messaging service a wireline telephone number, 404-332-212X, and two wireless telephone numbers, 404-792-123X and 404-792-100X.

Telephone list 102 also contains an activation flag indicating whether the subscriber has subscribed to the message waiting indicator (MWI) feature for the particular telephone number (device). In some instances, for example, on a seldom-used mobile telephone, a subscriber might not care to have nor want to pay for an MWI displayed on the telephone. In this example, the subscriber has opted for the MWI feature on two telephone lines, 404-332-212X and 404-792-123X.

Once messaging service provider 100 receives an unanswered call to one of the three telephone numbers and records a message, messaging service provider 100 sends an MWI message for each of the activated telephone numbers on list 102. For the wireline telephone number, messaging service provider 100 transmits an MWI message to a host switch 104 using Inter-switch Simplified Message Desk Interface (ISMDI). Host switch 104 is a central office switch. ISMDI is a signaling interface used by a messaging service provider to support incoming call and message waiting integration between all supported switches in a Local Access and Transport Area (LATA). Simplified Message Desk Interface (SMDI) defines signaling between a messaging system and a central office switch, which defines the original intended destination of a forwarded call.

After receiving an MWI message for the wireline telephone number 404-332-212X, host switch 104 determines if it "owns" (i.e., is associated with) the NPA/NXX (NPA—Numbering Plan Area/NXX—a specific central office) corresponding to the telephone number, and further, if it owns the particular number (last four digits). In this example, host switch 104 does own 404-332-212X. Therefore, host switch 104 activates an MWI on the subscriber's wireline telephone 106, which could be a stutter dial tone, for example.

For the wireless telephone number 404-792-123X, messaging service provider 100 forwards to host switch 104 an ISMDI MWI message that references the wireless telephone number. Host switch 104 determines that it does not own 404-792, and in response, forwards to a signal transfer point 108 an MWI message using a non-call-associated Signaling System 7 (SS7) signaling protocol, such as Transaction Capability Application Part (TCAP).

Wireline network signal transfer point 108 contains a table 110 that cross-references NPA/NXXs with network point codes. Point codes identify every node in the SS7 network in the format NNN CCC XXX, where NNN is a network identifier, CCC is a cluster identifier, and XXX is the node identifier. In this example, table 110 shows that 404-792 corresponds to point code 001.002.052. With this routing information, wireline network signal transfer point 108 transmits a TCAP message to wireless network signal transfer point 112, which services the wireless network 114 corresponding to point code 001.002.052. In this example, wireless network 114 is the foreign network.

Within wireless network 114, protocol gateway 116 translates the TCAP MWI message to a signaling protocol compatible with the wireless network, for example, Interim Standard 41 (IS41). After the translation, protocol gateway 116 transmits an MWI message through mobile switching center 118 and antenna 120 to the subscriber's wireless telephone 122. In response to the MWI message, wireless telephone 122 indicates that a message has been recorded in messaging service provider 100 by, for example, displaying an icon on its screen.

According to the conventional method shown in FIG. 1, routing is based on the 6-digit NPA/NXX, relying on the fact that the networks to which the foreign network telephone numbers belong (which, in this example, are wireless telephone numbers of a wireless network) can be identified based solely on the NPA/NXX. In other words, the method assumes that each NPA/NXX, as a block of 10,000 telephone numbers, is wholly owned by a single foreign network carrier (e.g., a single wireless carrier). Under this assumption, the host wireline telephone network can route all calls for a NPA/NXX to a particular trunk group of a foreign network carrier.

Unfortunately, not all NPA/NXXs are wholly owned by a single carrier. In fact, within a block of 10,000 telephone numbers in a NPA/NXX, some numbers may be assigned to the wireline network, some may be assigned to a wireless network, and still others may be assigned to other wireline and wireless networks. As used herein, a "shared NPA/NXX" refers to this situation, in which the block of 10,000 telephone numbers in an NPA/NXX is assigned to more than one entity. Therefore, to forward message waiting indicator messages to the proper foreign network carrier of a particular foreign network telephone number, the routing network must distinguish the foreign network telephone numbers from the other network numbers on a more granular basis. In other words, the routing network must identify the different networks to which individual telephone numbers within a single shared NPA/NXX belong.

SUMMARY OF THE INVENTION

The present invention is a method and system for forwarding information, such as a message waiting indicator message, to a telephone number of a foreign network (e.g., a wireless network) that is part of a shared NPA/NXX. Rather than relying on the simple 6-digit NPA/NXX routing of the prior art that is suitable only for wholly owned NPA/NXXs, the method and system of the present invention evaluate individual telephone numbers of shared NPA/NXXs to determine where, i.e., to what networks, information should be sent. As such, the present invention enables telephone service providers to provide customers having a telephone number of a shared NPA/NXX with the ability to receive a message waiting indicator on the telephone of the shared NPA/NXX telephone number. This expanded service offering widens a telephone service provider's customer base and generates increased profits.

In a representative embodiment of the present invention, the method and system use a service control point (SCP) and service package application (SPA) to deliver an MWI message from a messaging service provider to a wireless (i.e., foreign network) telephone number of a shared NPA/NXX. In addition, shared NPA/NXXs are marked as "portable" in a signal transfer point. Thus, when the signal transfer point receives an MWI message for a telephone number of a shared NPA/NXX, the signal transfer routes the MWI message to the service control point.

The service control point determines whether the shared NPA/NXX telephone number associated with the MWI message requires the special routing defined by this invention or requires conventional local number portability (LNP) network routing. (LNP network routing is described in the following publications which are incorporated by reference herein in their entireties: *Generic Switching and Signaling Requirements*, Versions 1.00 (Feb. 12, 1996), 1.01 (Apr. 3, 1996), 1.02 (Jun. 17, 1996), 1.03 (Sep. 4, 1996), 1.04 (Jan. 20, 1997), and 1.05 (Aug. 1, 1997), Lucent Technologies; *Illinois Number Portability Workshop, SCP Generic Requirements*, Ameritech; *Illinois Number Portability Workshop, SMS Generic Requirements*, Ameritech; *Illinois Number Portability Workshop, Generic Operator Services Switching Requirements* (Issue 1.1, Jun. 20, 1996), Nortel Networks; *Maryland Number Portability Consortium, Generic Switching* and *Signaling Requirements, Draft Version* 1.0, Apr. 26, 1996.) The service control point makes this determination by ascertaining whether the telephone number has a subscription. If the telephone number is without a subscription, the telephone number is not affected by the special routing of the present invention and the service control point formulates routing instructions according to standard LNP global title instructions (for example, as described in the above references). If the telephone number has a subscription, then the telephone number belongs to a foreign network that is an exception to LNP routing, in which case the service control point consults an inter-switch voicemail routing (ISVMR) service package application to formulate routing instructions.

The ISVMR service package application determines the carrier identification of the non-local foreign network to which the shared NPA/NXX telephone number belongs. The ISVMR service package application also determines from the carrier identification the corresponding point code to which the MWI message should be routed. The ISVMR service package application returns this information to the service control point routing software and the service control point returns the message and its new routing instructions to the signal transfer point to route the MWI message to a signal transfer point that serves the appropriate foreign network.

Thus, in this representative embodiment, by distinguishing between subscription telephone numbers (numbers belonging to a foreign network that is not handled by LNP processing) and non-subscription (numbers belonging to a network that is handled by LNP processing) telephone numbers, the service control point is able to identify the different networks to which individual telephone numbers within a single shared NPA/NXX belong. Consequently, the MWI message can be delivered to the individual telephones of the different networks.

Accordingly, it is an object of the present invention to deliver information to telephone numbers corresponding to shared NPA/NXXs and foreign networks.

Another object of the present invention is to integrate wireless telephones into a wireline messaging environment.

Another object of the present invention is to identify the different networks to which individual telephone numbers within a single shared NPA/NXX belong for the purpose of delivering signaling messages the individual telephones of the different networks.

Another object of the present invention is to provide a cost-effective means for providing message waiting indicators on telephone numbers associated with shared NPA/NXXs and foreign networks, especially wireless networks.

These and other objects of the present invention are described in greater detail in the detailed description of the invention, the appended drawings, and the attached claims.

DETAILED DESCRIPTION OF THE INVENTION

As illustrated by the following representative embodiments, the present invention is a method and system for forwarding information to a foreign network telephone number that is part of a shared NPA/NXX. In this representative embodiment, the information is a message waiting indicator (MWI) message from a messaging service provider and the foreign network is a wireless network.

Figure 1:
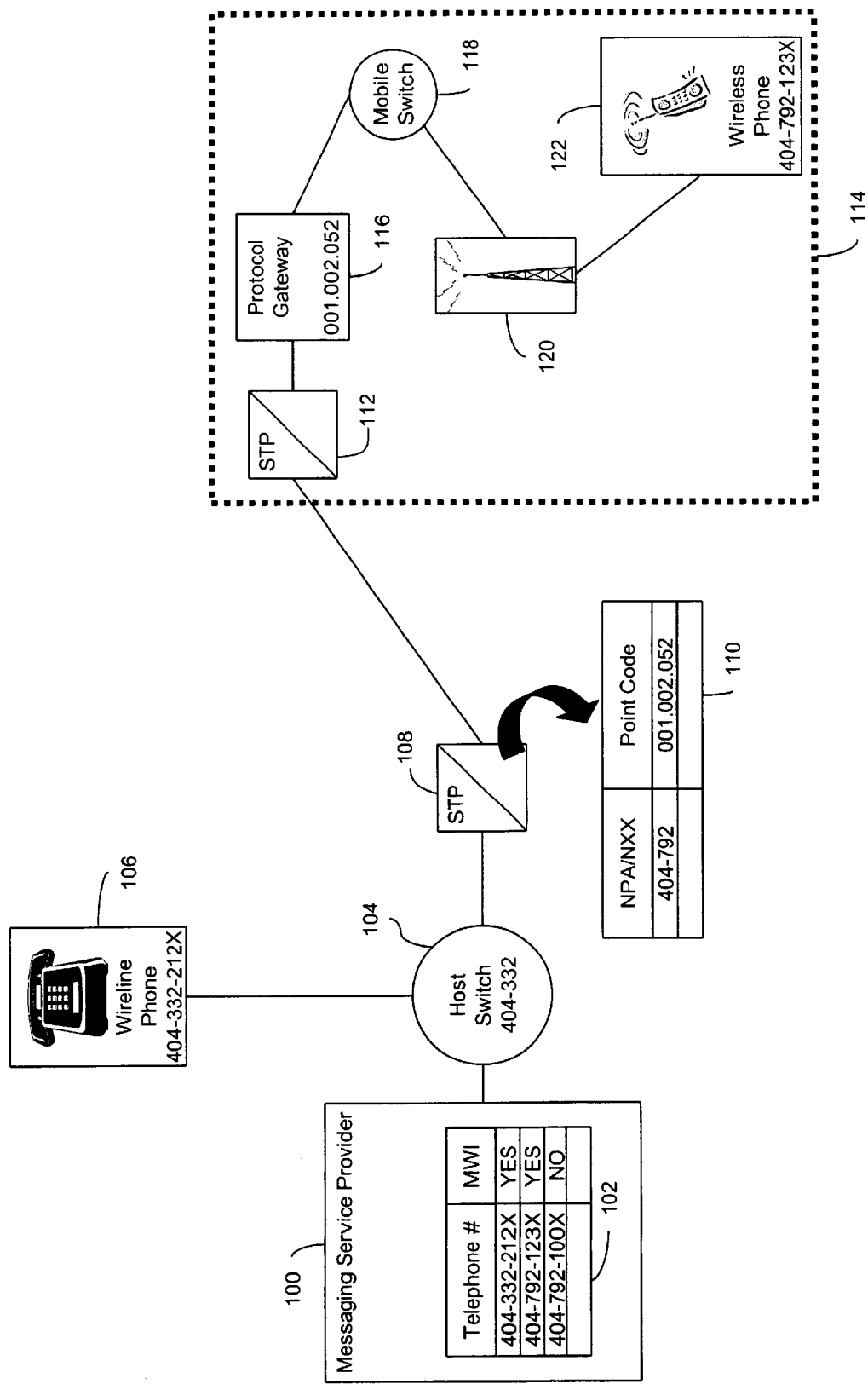
FIG. 1 is a schematic diagram of a prior art system architecture that supports messaging from a voicemail platform to a wireless network.
Figure 2:
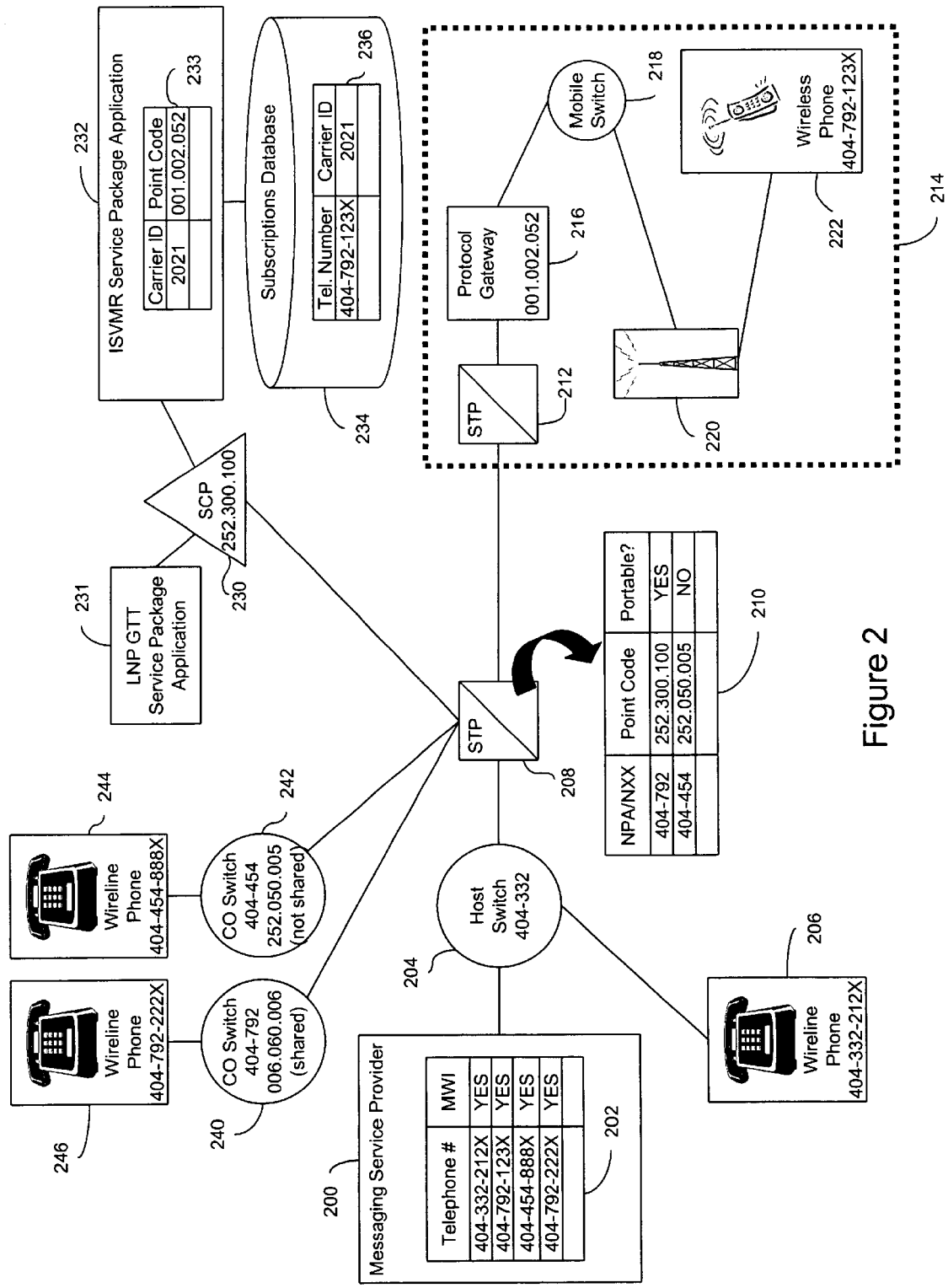
FIG. 2 is a schematic diagram of a system architecture that uses a service control point (SCP) and service package application (SPA) to deliver an MWI message to a wireless telephone number of a shared NPA/NXX, according to a second representative embodiment of the present invention.

Referring to FIG. 2, a representative embodiment of the present invention provides a method and system that uses a service control point (SCP) and service package application (SPA) to deliver an MWI message to a wireless telephone number of a shared NPA/NXX. The primary components of the system include a messaging service provider 200, a wireline network signal transfer point 208, a service control point 230, and an inter-switch voicemail routing (ISVMR) service package application 232.

Messaging service provider 200 includes a telephone list 202 for each subscriber of the voicemail service. Telephone list 202 indicates the particular telephone numbers to which an MWI message is sent when messaging service provider 200 records a message for the subscriber. Telephone list 202 contains flags indicating which telephone numbers are to receive MWI messages, which in this example are numbers 404-332-212X, 404-792-123X, 404-454-888X, and 404-792-222X.

Wireline network signal transfer point 208 is in communication with messaging service provider 200 through host switch 204. Host switch 204 is also in communication with wireline telephone 206, which is local to host switch 204. Wireline network signal transfer point 208 includes a global title translation (GTT) table 210 that associates NPA/NXXs with point codes. In this manner, wireline network signal transfer point 208 routes a message to a particular a point code based on the NPA/NXX of the telephone number referenced in the message. This translation is similar to translations completed outside the context of local number portability (LNP). In this example, the NPA/NXX 404-792 is associated with the point code 252.300.100, and the NPA/NXX 404-454 is associated with the point code 252.050.005.

Service control point 230 is in communication with wireline network signal transfer point 208, with LNP GTT service package application (SPA) 231, and with ISVMR service package application 232. Although shown as separate components, LNP GTT service package application 231 and ISVMR service package application 232 could be a contained within service control point 230.

ISVMR service package application 232 contains a translation table 233 that associates carrier identifications (IDs) with point codes, for example, carrier 2021 corresponds to point code 001.002.052, as shown in FIG. 2. Preferably, the carrier IDs are Operating Company Numbers (OCNs), which are codes used in the telephone industry to identify an operating landline or wireless telephone company. ISVMR service package application 232 is in communication with a subscriptions database 234, which, although shown as a separate component, could be a part of ISVMR service package application 232. Subscriptions database 234 contains a translation table. 236 that associates 10-digit telephone numbers with telephone network carriers. In this example, telephone number 404-792-123X is associated with carrier 2021. Carrier 2021 corresponds to a wireless network 214.

To complete the description of the system architecture in which the present invention operates, wireline network signal transfer point 208 is in communication with a shared NPA/NXX central office switch 240, with a non-shared NPA/NXX central office switch 242, and with a wireless network signal transfer point 212. Central office switches 240 and 242 are adapted to receive an MWI message from wireline network signal transfer point 208 and to activate an MWI on the telephone number referenced in the received message, which is a telephone number served by the switch. In this example, shared NPA/NXX central office switch 240 serves telephone 246 and non-shared NPA/NXX central office switch 242 serves telephone 244.

Wireless network signal transfer point 212 of wireless network 214 is adapted to receive an MWI message from wireline network signal transfer point 208 and to forward the message to a particular point code. In this case, wireless network signal transfer point 212 is in communication with protocol gateway 216. Protocol gateway 216 has the particular point code to which wireless network signal transfer point 212 sends MWI messages. Protocol gateway 216 receives MWI messages in SS7 format and translates the messages into a format suitable for wireless network 214, e.g., IS41, Global System of Mobile Communications (GSM), or Short Message Service (SMS). Protocol gateway 216 delivers the MWI message to wireless telephone 222 through a mobile switch 218 and an antenna 220.

Figure 3A:
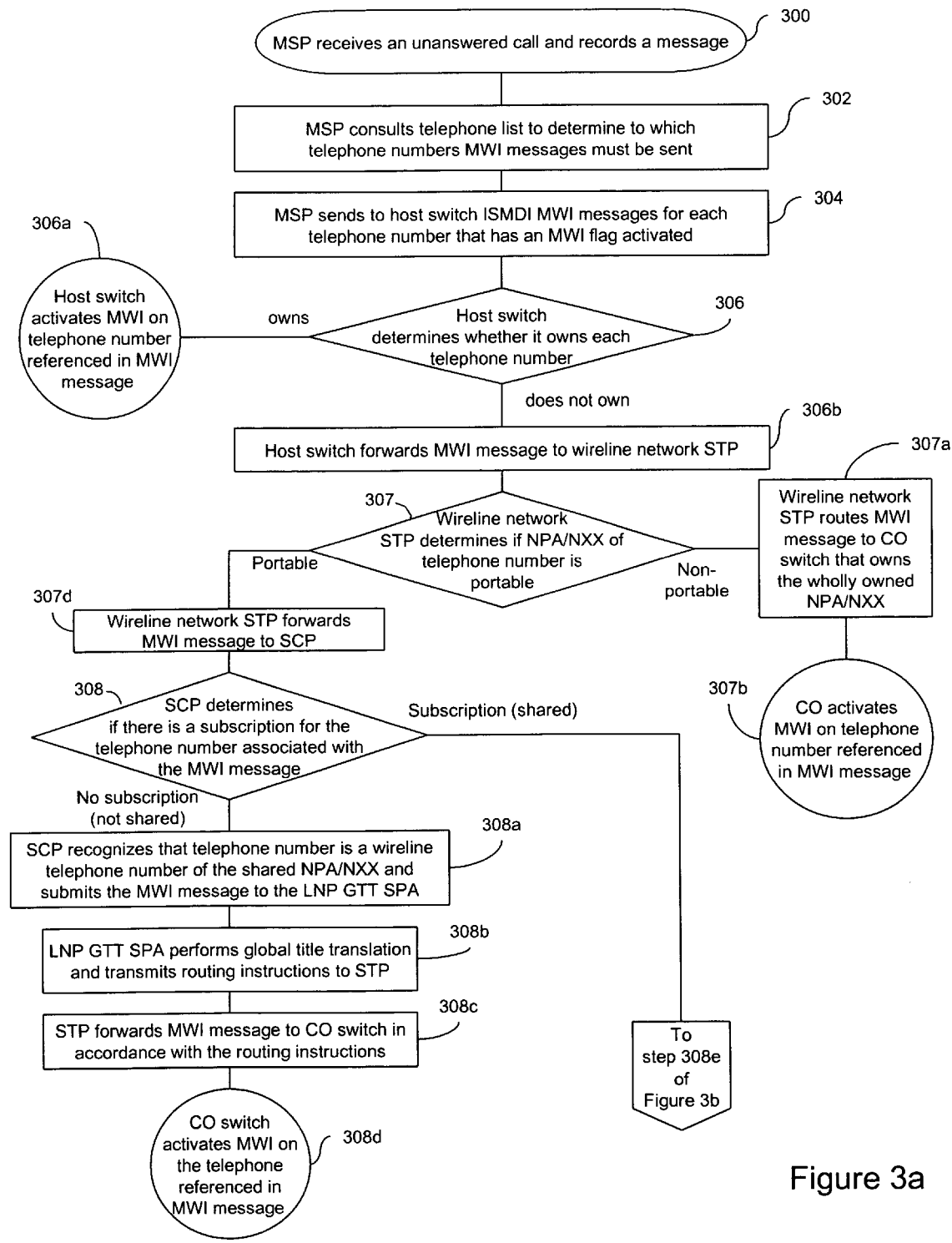
FIGS. 3a and 3b are flowcharts tracing the steps of the information flow of FIG. 2.
Figure 3B:
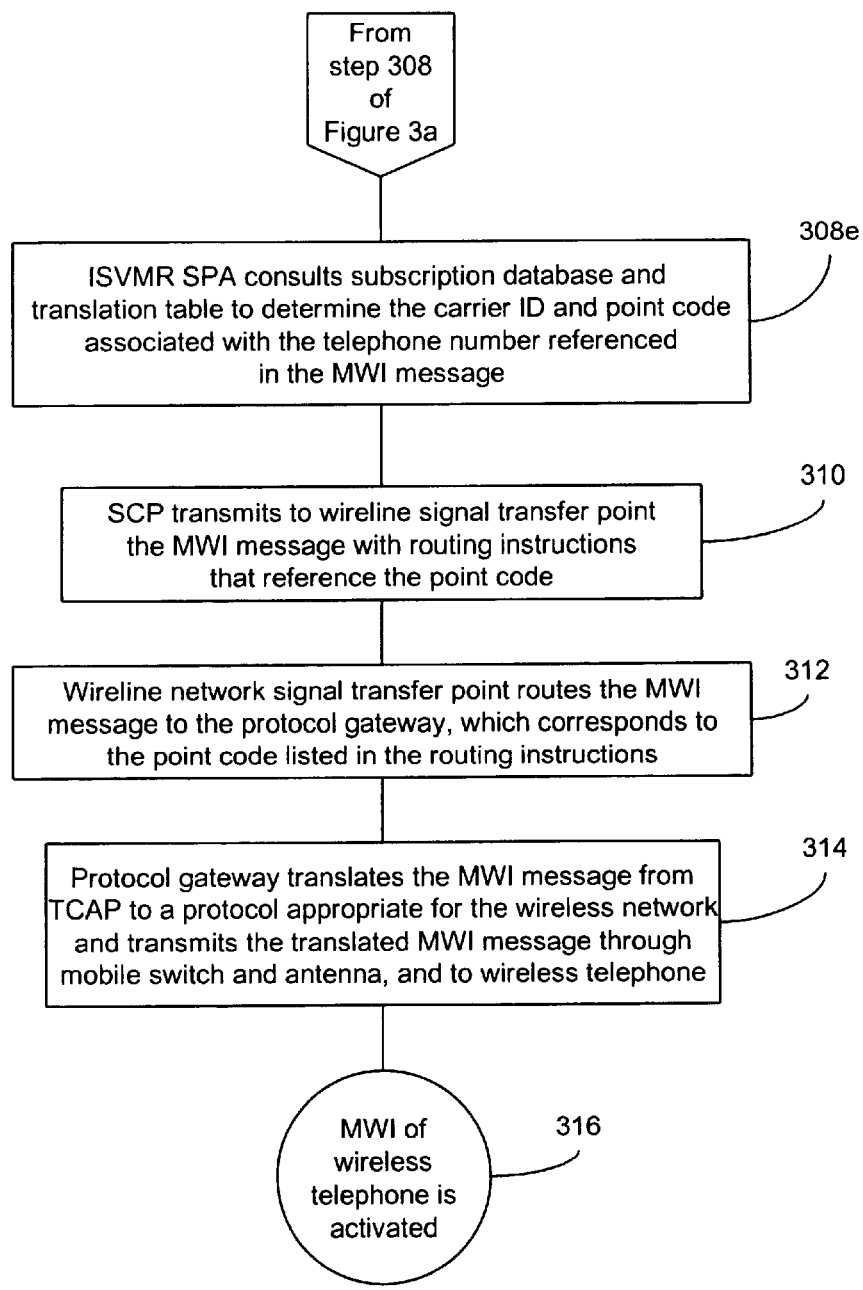

According to this representative embodiment of the present invention, the system operates in the following manner, as shown in FIGS. 2, 3a, and 3b. Although the methods described in the specification and illustrated in the figures contain many specific examples of signaling flow steps, these steps should not be construed as limitations on the scope of the invention. Rather, these steps should be construed as examples of signaling flow steps that could be used to practice the invention. As would be apparent to one of ordinary skill in the art, many other variations on the system operation are possible, including differently grouped and ordered method steps. Accordingly, for this and all other representative embodiments, the scope of the invention should be determined not by the embodiments illustrated, but by the appended claims and their equivalents.

In step 300, messaging service provider 200 receives an unanswered call to a telephone line of the subscriber and records a voicemail message from the caller. (In advance of step 300,. FIG. 3 assumes that appropriate provisioning has taken place within the network on behalf of the subscriber to make the service of the present invention available.) In step 302, messaging service provider 200 consults list 202 to determine the telephone numbers that are to receive, MWI messages. In step 304, messaging service provider 200 sends ISMDI MWI messages to host switch 204 for each telephone number that has an MWI flag activated, which in this case is the subscriber's wireline telephone numbers 404-332-212X, 404-454-888X, and 404-792-222X, and the subscriber's wireless telephone number 404-792-123X.

In step 306, host switch 204 receives the MWI messages and determines whether the telephone number referenced in each MWI message is local to host switch 204. If the telephone number is local, then, in step 306a, host switch 204 activates the MWI on the telephone number referenced in the MWI message. In this example, the NPA/NXX 404-332 is local to host switch 204. Thus, host switch activates the MWI on telephone number 404-332-212X, corresponding to telephone 206.

If the telephone number referenced in the MWI message is not local to host switch 204, in step 306b, host switch 204 forwards the MWI message to wireline network signal transfer point 208 for further routing. Host switch 204 forwards the MWI message in the form of TCAP message. In this example, the MWI messages for 404-792-123X, 404-454-888X, and 404-792-222X are not local to the NPA/NXX (404-332) of host switch 204, and are therefore forwarded to wireline network signal transfer point 208.

In step 307, wireline network signal transfer point 208 receives the TCAP MWI messages and looks up the NPA/NXX for each MWI message in GTT translation table 210. In associating NPA/NXXs with point codes, GTT translation table 210 distinguishes between portable and non-portable telephone numbers. Messages to non-portable telephone numbers are forwarded to the point code of a central office switch that wholly owns the NPA/NXX. Messages to portable telephone numbers are forwarded to the point code of a local number portability global title translation service control point, which is service control point 230 in this example. If not already marked as portable, shared NPA/NXXs must be marked portable so that they are forwarded to a service control point (SCP 230) that determines the networks to which individual telephone numbers of a shared NPA/NXX belong.

Thus, in the present example, the MWI message for 404-454-888X corresponds to the entry in GTT table 210 listing the NPA/NXX 404-454 and the point code 252.050.005. The point code 252.050.005 corresponds to central office switch 242, which wholly owns the 404-454 NPA/NXX. The MWI messages for 404-792-123X and 404-792-222X correspond to the entry in GTT table 210 listing the NPA/NXX 404-792 and the point code 252.300.100. The point code 250.300.100 corresponds to service control point 230 because the 404-792 NPA/NXX is a shared NPA/NXX that requires further processing to determine the networks to which the telephone numbers 404-792-123X and 404-792-222X belong.

In step 307, if wireline network signal transfer point 208 determines that the MWI message references a telephone number of a wholly owned NPA/NXX (i.e., the telephone number is non-portable), then in step 307a wireline network signal transfer point 208 forwards the MWI message to the point code of the central office switch that owns the NPA/NXX. In this case, wireline signal transfer point 208 forwards the MWI message to central office switch 242 (which corresponds to point code 252.050.005). Then, in step 307b, central office switch 242 activates the MWI on the telephone number referenced in the MWI message, which in this case is 404-454-888X.

If wireline network signal transfer point 208 determines in step 307 that the MWI message references a telephone number that is portable, in step 307d the MWI message is forwarded to the point code of a service control point that ascertains the network to which the telephone number referenced in the MWI message belongs. Here, wireless network signal transfer point 208 forwards the MWI messages for telephone numbers 404-792-123X and 404-792-222X to point code 252.300.100, which corresponds to service control point 230.

In step 308, service control point 230 determines whether the owner of the telephone number referenced in the MWI message subscribes to ISVMR. A subscription to ISVMR indicates that the NPA/NXX of the referenced telephone number is shared, whereas no subscription indicates that the NPA/NXX of the referenced telephone number is not shared and that the MWI message corresponding to the reference telephone number should be handled by LNP processing. Service control point 230 determines whether a subscription exists by querying ISVMR service package application 232. ISVMR service package application 232 searches for the telephone number in table 236 of subscription database 234.

If the telephone number is not in subscription database 234, service control point 230 recognizes that the telephone number is a wireline telephone number of the shared NPA/NXX. As such, in step 308a, service control point 230 submits the MWI message to LNP GTT service package application 231 for traditional local number portability routing. In this example, the MWI message referencing the telephone number 404-792-222X is not listed in subscription database 236 and is therefore deemed to be a wireline telephone number of the shared NPA/NXX 404-792.

In step 308b, LNP GTT service package application 231 performs a 10-digit global title translation on the wireline telephone number 404-792-222X to determine its point code, which in this case is 006.060.006. LNP GTT service package application 231 sends this point code 006.060.006 in routing instructions to wireline network signal transfer point 208, along with the MWI message. In step 308c, wireline network signal transfer point 208 forwards the MWI message to the point code 006.060.006, which corresponds to central office switch 240. In step 308d, central office switch 240 activates the MWI on telephone 246, which corresponds to telephone number 404-792-222X.

If, in step 308, ISVMR service package application 232 determines that the telephone number is listed in table 236 of subscription database 230, service control point 230 recognizes that the owner of the telephone number referenced in the MWI message subscribes to ISVMR and that the referenced telephone number belongs to a shared NPA/NXX. To complete routing, service control point 230 must have the point code of the network carrier to which the telephone number referenced in the MWI message belongs.

Therefore, in step 308e (FIG. 3b), ISVMR service package application 232 consults subscription database 236 for the carrier identification associated with the telephone number referenced in the MWI message. For example, in this case, the telephone number 404-792-123X yields the carrier identification 2021, which is assigned to wireless network 214. ISVMR service package application 232 then consults translation table 233 to determine the point code corresponding to the carrier identification. In this example, carrier identification 2021 corresponds to point code 001.002.052, which is assigned to protocol gateway 216 within wireless network 214.

In step 310, service control point 230 formulates routing instructions from the point code information supplied by ISVMR service package application 232 and transmits the routing instructions to wireline network signal transfer point 208. In step 312, wireline network signal transfer point 208 routes the MWI message to the point code listed in the routing instructions. In this example, the MWI message is routed as a TCAP message through wireless network signal transfer point 212 to protocol gateway 216.

In step 314, protocol gateway 216 translates the MWI message from TCAP to a protocol compatible with wireless network 214, e.g., IS41, GSM, or SMS. Protocol gateway 216 then transmits the translated MWI message through mobile switch 218 and antenna 220, and to wireless telephone 222.

Finally, in response to receiving the MWI message, in step 316, the MWI of wireless telephone 222 is activated, e.g., an icon is displayed on a screen.

Although the above embodiments are presented in the context of MWI messages delivered to a wireless network for display on a wireless telephone, the present invention applies equally well to any situation in which a network must distinguish between telephone numbers of a shared NPA/NXX to determine to which foreign network information should be sent. In the above example, the foreign network is a wireless network that takes the MWI message, translates it to its own protocol, and delivers it to a wireless telephone, which activates an MWI for a user to see. The functions of the present invention are completed before the MWI message is delivered to the foreign network. Therefore, as one of ordinary skill in the art would appreciate, the same systems and methods would apply to any foreign network, even other wireline networks. For example, the present invention applies to interworking message systems between independent or private wireline networks.

The foreign network could also be a global computer network, such as the Internet. In this alternate embodiment, the method and system of the present invention deliver information (e.g., an MWI message), through an appropriate protocol gateway, over the Internet to a user's network access device, e.g., a computer or wireless handheld access device. Thus, if a user is online and away from his telephone(s), an Internet-based MWI can alert the user of new messages received in his voicemail box. As an example, the Internet-based MWI could be a pop-up window displayed over the graphical user interface of a web browser. Or, conversely, using an SS7/IP gateway, the present invention could deliver IP messages to a signal transfer point.

In addition, although the representative embodiment of the present invention is described in the context of voicemail and the delivery of MWI messages, the present invention is not limited to the delivery of this type of information. Indeed, the present invention applies to all situations in which any information must be sent to telephone numbers associated with a shared NPA/NXX and a foreign network. The information could be messages, such as electronic mail, facsimiles, or any Internet-related events, such as auction notifications or stock price threshold alerts. As another example, the present invention provides significant advantages for integrated unified messaging systems, in which a mailbox stores data from multiple media, such as facsimile, electronic mail, and voicemail. The present invention would facilitate the delivery of an indicator showing that data has been received in the mailbox of an integrated unified messaging system. Moreover, in addition to just an indicator, the present invention could also facilitate the delivery of the data stored in the mailbox.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for forwarding information to a telephone number of a shared central office, wherein the method determines whether the telephone number belongs to a foreign network, the method comprising:

marking the telephone number as portable in a signal transfer point;

forwarding the information to a service control point;

determining whether a subscription exists for the telephone number; and if a subscription exists, then consulting a service package application to determine a foreign network point code associated with the telephone number;

transmitting the information to the signal transfer point with routing instructions that reference the foreign network point code; and transmitting the information to the foreign network point code, wherein the information is a message waiting indicator message.

2. The method of claim 1, further comprising:

if no subscription exists, then performing a local number portability global title translation that returns a central office switch point code;

transmitting the information to the signal transfer point with routing instructions that reference the central office switch point code; and transmitting the information to the central office switch point code.

3. The method of claim 2, further comprising:

translating the information to a protocol compatible with the foreign network;

transmitting the information to a telephone of the foreign network, wherein the telephone corresponds to the telephone number; and indicating receipt of the information on the telephone.

4. The method of claim 2, wherein, if no subscription exists, then the telephone number is not part of the foreign network, and wherein, if a subscription exists, then the telephone is part of the foreign network.

5. The method of claim 1, wherein consulting a service package application to determine a foreign network point code associated with the telephone number comprises:

consulting a database that cross-references the telephone number with a carrier identification, wherein the carrier identification corresponds to the foreign network; and consulting a translation table that cross-references the carrier identification with the foreign network point code.

6. The method of claim 1, wherein the foreign network is a wireless network.

7. The method of claim 1, wherein the information is forwarded by an integrated unified messaging system, and wherein the information is an indicator message for showing that data has been received in the integrated unified messaging system.

8. The method of claim 1, wherein the foreign network is a global computer network.

9. The method of claim 8, wherein the global computer network is the Internet and the information is an Internet-based message waiting indicator message.

10. The method of claim 9, wherein the Internet-based message waiting indicator message generates a pop-up window displayed over a graphical user interface of a web browser.

11. The method of claim 1, further comprising:
  translating the information to a protocol compatible with the foreign network;
  transmitting the information to a telephone of the foreign network, wherein the telephone corresponds to the telephone number; and
  indicating receipt of the information on the telephone.

12. The method of claim 1, wherein marking the telephone number as portable in a signal transfer point further comprises listing a point code associated with the service control point,
  and wherein the step of forwarding the information to a service control point comprises forwarding the information to the point code associated with the service control point.

13. A system for forwarding information to a telephone number of a shared central office, wherein the system determines whether the telephone number belongs to a foreign network, the system comprising:
  a signal transfer point;
  a translation table to which the signal transfer point has access, wherein the translation table marks telephone numbers of shared central offices as portable and associates a service control point point code with each shared central office telephone number;
  a service control point in communication with the signal transfer point, wherein the service control point corresponds to the service control point point code; and
  a first service package application in communication with the service control point, wherein the first service package application is adapted to determine a point code associated with a particular telephone number,
  wherein the information is a message waiting indicator message.

14. The system of claim 13, further comprising a second service package application in communication with the service control point, wherein the second service package application is adapted to perform local number portability global title translation.

15. The system of claim 14, wherein the information is forwarded by a messaging service provider to the signal transfer point,
  wherein the signal transfer point looks up the telephone number in the translation table, determines whether the telephone number is portable, and, if so, finds the associated service control point point code and forwards the information to the service control point,
  wherein the service control point determines if the telephone number has a subscription and forwards telephone numbers having a subscription to the first service package application and telephone numbers not having a subscription to the second service package application,
  wherein the first service package application determines point codes associated with telephone numbers having subscriptions and returns routing instructions to the signal transfer point,
  and wherein the second service package application performs a local number portability global title translation on telephone numbers not having subscriptions and returns routing instructions to the signal transfer point.

16. The system of claim 13, wherein the point code corresponds to a foreign network.

17. The system of claim 13, wherein the foreign network is a wireless network and the signal transfer point is contained in a wireline network.

18. The system of claim 13, wherein the information is forwarded by an integrated unified messaging system and the information is an indicator message for showing that data has been received in the integrated unified messaging system.

19. The system of claim 13, further comprising a protocol gateway in communication with the signal transfer point, wherein the protocol gateway is adapted to translate the information to a protocol compatible with the foreign network.

20. The system of claim 21, further comprising:
  a mobile switch in communication with the protocol gateway;
  an antenna in communication with the mobile switch; and
  a wireless telephone in communication with the antenna, wherein the wireless telephone corresponds to the particular telephone number.

21. The system of claim 20, wherein, in response to receiving information referencing the particular telephone number, the mobile switch activates one of a message waiting indicator and an indicator showing data has been received on the wireless telephone.

22. The system of claim 13, wherein the first service package application comprises:
  a database that cross-references telephone numbers with carrier identifications; and
  a point code translation table that cross-references carrier identifications with point codes.

23. A service control point for forwarding information to a telephone number of a shared central office, the service control point comprising:
  a subscriptions database that lists telephone numbers that subscribe to a service for forwarding information from a message service provider to a telephone of a shared central office;
  a first service package application that generates routing instructions using local number portability global title translation; and
  a second service package application that generates routing instructions by determining a foreign network point code corresponding to a particular telephone number,
  wherein if the service control point receives information intended for a telephone that is not listed in the subscriptions database, the service control point formulates routing instructions using the first service package application,
  wherein if the service control point receives information intended for a telephone number listed in the subscriptions database, the service control point formulates routing instructions using the second service package application, and wherein the information is a message waiting indicator message.

24. The service control point of claim 23, wherein the subscriptions database lists the telephone numbers with their associated carrier identifications and the second service package application contains a table cross-referencing carrier identifications with their associated point codes.

25. The service control point of claim 24, wherein the second service package application determines a foreign network point code corresponding to a particular telephone number by consulting the subscriptions database to determine a carrier identification corresponding to the particular telephone and consulting the table to determine the foreign network point code associated with the carrier identification.

26. The service control point of claim 24, wherein the telephone numbers in the subscriptions database are 10-digit telephone numbers and the carrier identifications in the subscriptions database are operating company numbers.

27. The service control point of claim 23, wherein the information is forwarded by an integrated unified messaging system, and wherein the information is an indicator message for showing that data has been received in the integrated unified messaging system.

28. A method for determining to which network a telephone number of a shared central office belongs, wherein the telephone number is associated with information, the method comprising:

forwarding the information to a service control point;

looking for the telephone number in a subscriptions database;

if the telephone number is not in the subscriptions database, performing a local number portability global title translation on the telephone number; and if the telephone number is in the subscriptions database, determining a point code associated with the telephone number, wherein the information is a message waiting indicator message forwarded by a messaging service provider.

29. The method of claim 28, wherein determining a point code associated with the telephone number comprises:

consulting the subscriptions database to determine a carrier identification associated with the telephone number; and consulting a table that cross-references carrier identifications with point codes to determine a point code associated with the carrier identification.

30. The method of claim 29, wherein the telephone numbers in the subscriptions database are 10-digit telephone numbers and the carrier identifications in the subscriptions database are operating company numbers.

31. The method of claim 28, wherein the information is forwarded by an integrated unified messaging system, and wherein the information is an indicator message for showing that data has been received in the integrated unified messaging system.

32. The method of claim 31, wherein the information further includes the data.

33. The method of claim 28, wherein the foreign network is a global computer network.

34. The method of claim 33, wherein the global computer network is the Internet and the information is an Internet-based message waiting indicator message.

35. The method of claim 34, wherein the Internet-based message waiting indicator message generates a pop-up window displayed over a graphical user interface of a web browser.

* * * * *

UNITED STATES PATENT AND TRADEMARK OFFICE
CERTIFICATE OF CORRECTION

PATENT NO. : 6,842,506 B1
DATED : January 11, 2005
INVENTOR(S) : James C. Bedingfield It is certified that error appears in the above-identified patent and that said Letters Patent is hereby corrected as shown below:

<u>Column 12,</u>
Line 28, "The system of claim 21" and replace with -- the system of claim 19 --.

Signed and Sealed this

Third Day of May, 2005

JON W. DUDAS
*Director of the United States Patent and Trademark Office*